May 19, 1959   F. S. LAPEYRE ET AL   2,886,844
PRESSURE DEVICES FOR PEELING SHRIMP
Filed Jan. 23, 1957   3 Sheets-Sheet 1
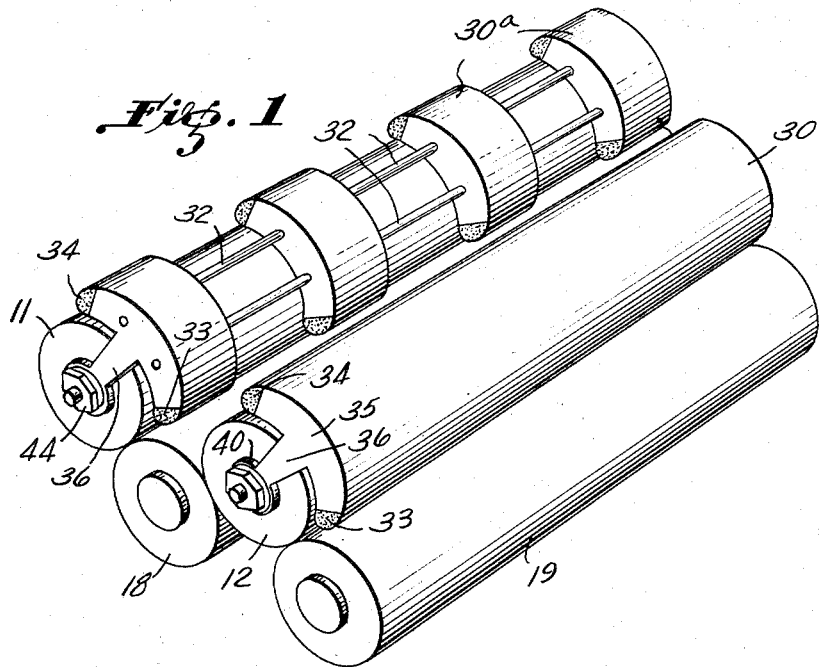
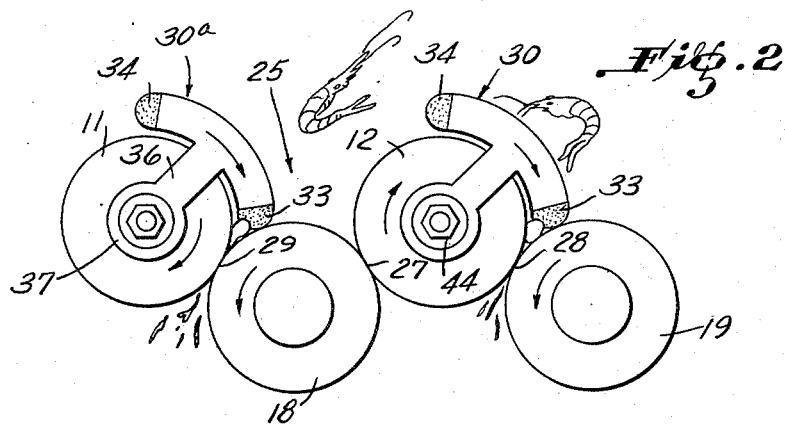
INVENTORS
F. S. LAPEYRE
J. M. LAPEYRE
L. E. DE MAREST
BY
Wilkinson, Mawhinney & Theibault
ATTORNEYS May 19, 1959   F. S. LAPEYRE ET AL   2,886,844
PRESSURE DEVICES FOR PEELING SHRIMP
Filed Jan. 23, 1957   3 Sheets-Sheet 2
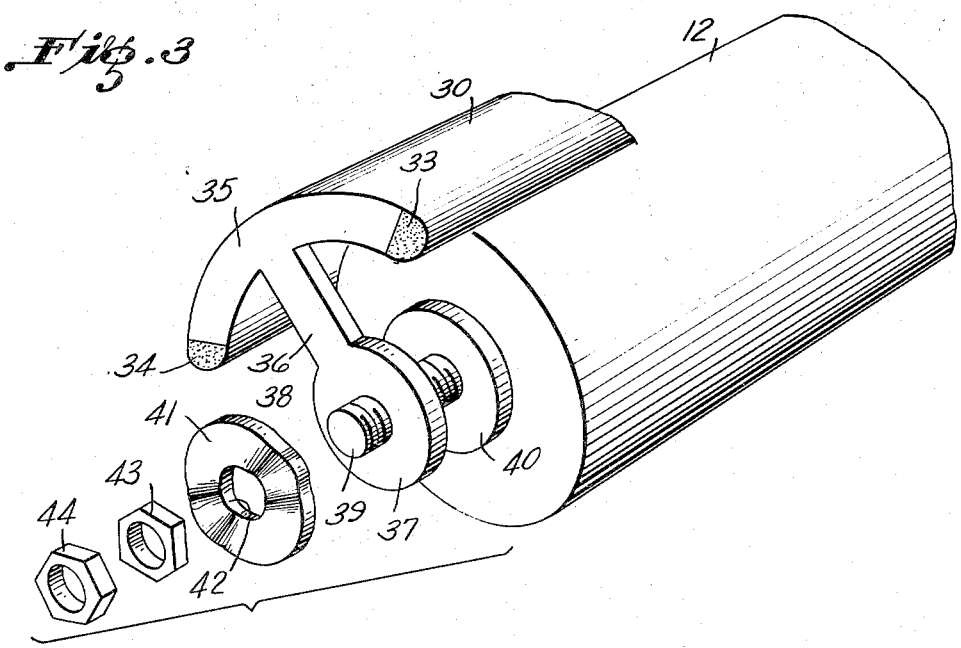
INVENTORS
F. S. LAPEYRE
J. M. LAPEYRE
L. E. DEMAREST
BY
Wilkinson, Mawhinney & Theibault
ATTORNEYS May 19, 1959  F. S. LAPEYRE ET AL  2,886,844
PRESSURE DEVICES FOR PEELING SHRIMP
Filed Jan. 23, 1957  3 Sheets-Sheet 3

INVENTORS
F. S. LAPEYRE
J. M. LAPEYRE
L. E. DEMAREST
BY
Wilkinson, Mawhinney & Theibault
ATTORNEYS

United States Patent Office 2,886,844
Patented May 19, 1959

2,886,844

PRESSURE DEVICES FOR PEELING SHRIMP

Fernand S. Lapeyre, James M. Lapeyre, and Le Roy E. Demarest, New Orleans, La., assignors to The Peelers Company, Houma, La., a partnership Application January 23, 1957, Serial No. 635,785

13 Claims. (Cl. 17—2)

The present invention relates to pressure devices for peeling shrimp and more particularly refers to a device for applying pressure to shrimp or the like in peeling crotches of shrimp peeling machines to obtain a more efficient peeling of the shrimp.

Among other applications the invention will be found useful in connection with the shrimp peeling rollers disclosed in U.S. Patent 2,574,044, granted November 6, 1951, and as a substitute for the pressure fingers 77 and 78 disclosed in U.S. Patent 2,537,355, granted January 9, 1951, the invention being also applicable to shrimp peeling machines such as disclosed in U.S. Patent 2,637,065, granted May 5, 1953.

It is an object of the invention, in one aspect thereof, to provide partial or full rotary members or bodies which constitute the pressure devices which may swing toward and from the nips or peeling crotches for alternately applying pressure to shrimp in a direction toward the peeling crotches, and subsequently to swing away from the crotches to expose the same for the ejection of the peeled meat and to receive future supplies of the raw shrimp for peeling.

In the aspect of the invention referred to in the immediately preceding paragraph, it is another object of the invention to provide oscillating pressure devices mounted to move with the peeling rollers and to derive their motion from the rollers and from the source of power for operating such rollers so that it is not necessary to supply any additional source of power to energize the pressure devices.

In another aspect of the invention, it is an object thereof to provide rotary pressure devices mounted to roll lengthwise of the peeling crotches to ride upon the raw shrimp which have moved into peeling relation to such crotches; together with a mechanism for operating such rolling pressure devices, and as an addition thereto, if desired, to superimpose upon such rolling pressure devices a compound movement which consists in reciprocating the rolling devices toward and from the crotches.

It is a further object of the invention to achieve the foregoing results by a simple form of mechanism which will operate reliably and economically and which will entail no damage to the shrimp.

With the foregoing and other objects in view, the invention will be more fully described hereinafter, and will be more particularly pointed out in the claims appended hereto.

In the drawings, wherein like symbols refer to like or corresponding parts throughout the several views:

Figure 1 is an isometric view of a unit form of peeling machine equipped with pressure devices pursuant to the present invention.

Figure 2 is an end elevational view of the same.

Figure 3 is an exploded isometric view showing a form of slip friction clutch that may be used to mount the pressure devices to a peeling roller.

Figure 4:
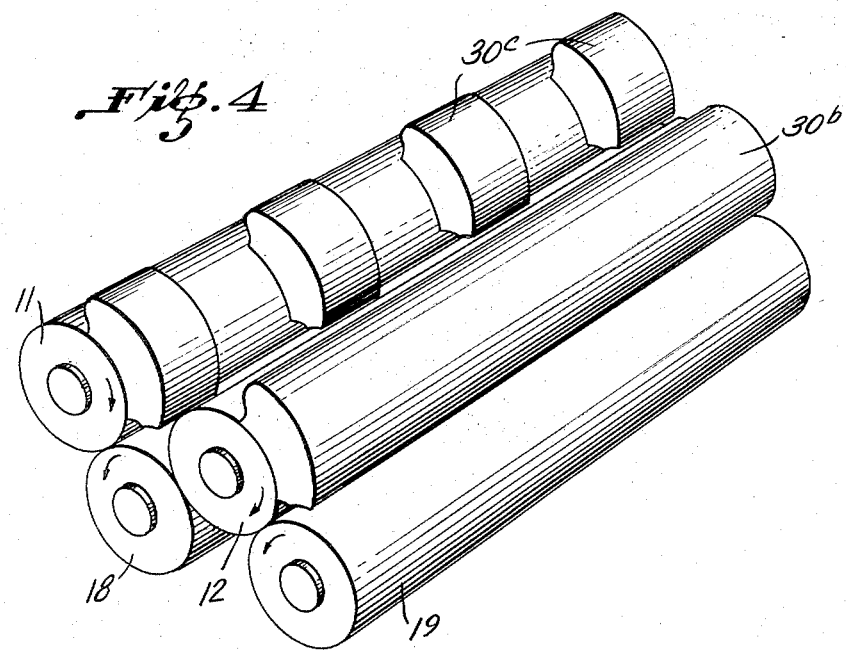
Figure 4 is an isometric view similar to Figure 1 showing a modified form of pressure devices.

Referring more particularly to the drawings and for the present to Figures 1 to 3 inclusive, there is illustrated a peeling machine of the character shown more particularly in Figures 7 and 8 of U.S. Patent 2,574,044, in which 11 and 12 designate upper rollers and 18 and 19 lower rollers associated together to provide channels 25 along which the shrimp are propelled by gravity and/or a liquid stream, and 27, 28 and 29 designate peeling crotches, nips or bights.

The rollers are oscillated back and forth by any suitable means, for instance that illustrated in said Patent 2,574,044. According to that patent the lower rollers 18, 19 etc. are driven in an oscillating movement back and forth and they communicate a like although relatively opposite movement to the upper rollers 11, 12, etc.

The upper rollers 11, 12 carry pressure bodies 30, 30ª, for instance in strip form such as shown at 30 or in segmental form as shown at 30ª, the segments 30ª being connected together by rods 32 or the like as shown in Figure 1.

The pressure bodies, whether in the strip or segmental form, are provided with pliable pressure tips 33 and 34 which may be flexible or resilient, preferably resilient rubber.

At opposite ends of the pressure body 30, 30ª, are end plates 35 having radial arms 36 as supported by clutch plates 37 having central apertures 38 for fitting over threaded studs 39 which project out from the ends of the rollers 11, 12.

Other clutch plates 40 are affixed to the ends of the rollers 11, 12 and these latter clutch plates may be of nylon or similar friction material.

Fitted over the studs 39 outwardly of the clutch plates 37 are bent spring washers 41 having elongated openings 42 therein, the washers 41 being retained in place by nuts 43 and lock nuts 44.

The parts 37–44 inclusive constitute a slip friction clutch which may be mounted at one or both ends of the rollers 11, 12, it being understood that the nuts 43 and 44 are threaded upon the outer end of the stud 39 outwardly of the spring washer 41 which bears with resilient pressure against the outer face of the clutch plate 37 and urges this clutch plate as to its inner face against the outer face of the roller clutch plate 40. The latter clutch plate 40 is affixed to rotate with the roller 11, 12. The washer 41 is preferably sprung or offset outwardly at its central portion so that its end parts engage the outer face of the friction disk 37. The nut 43 engages the central outsprung portion of the washer 41 and when the nut 43 is tightened on the stud 39 the offset sprung portion of the washer tends to move more nearly into the plane of the end portions of the washer thus exerting through these end portions an elastic stress of a variable character upon the clutch plate 37, forcing this clutch plate 37 with its variable yielding pressure against the outer friction face of the roller clutch plate 40. This tends to entrain the pressure body 30 or 30ª to oscillate back and forth with the roller 11, 12.

In the use of this form of the device, as the rollers 11, 12 carrying the pressure bodies are oscillated back and forth they carry such pressure bodies with them into a similar oscillating movement due to the friction pressure exerted by the friction clutches. In one position of the rollers 11, 12, shown in Figure 2, the pressure tips 33 are shown in engagement with shrimp in the peeling crotches 28, 29, from which it will be seen that these tips are deformable so as to exert elastic pressure of the tips against the shrimp in addition to the pressure which is exerted by the roller drive mechanism tending to rotate the pressure bodies against the shrimp in the nips.

The shrimp and the like are thus kneaded into the peeling crotches by the pressure bodies or splines, the latter being clutch driven in the same direction as the roller to which the clutches and pressure bodies are attached.

As the reciprocating or oscillating stroke changes, the pressure bodies or splines are frictionally engaged at the roller ends and are driven by the roller itself. When the pressure tips 33, 34 reach the peeling crotches, the roller may continue its stroke but the pressure body or spline will slip at the clutch and "dwell" at the peeling crotch until the reciprocating or oscillating stroke of the roller reverses, thus allowing pressure to be applied to the shrimp in the crotches for longer periods of time.

The spring washers maintain pressure on the clutch plates 37 and end plates 35 but give to allow slip required at the end of each stroke. This slip constitutes a lost-motion connection between the roller and pressure body. The nuts and lock nuts allow for tension adjustment.

Figure 5:
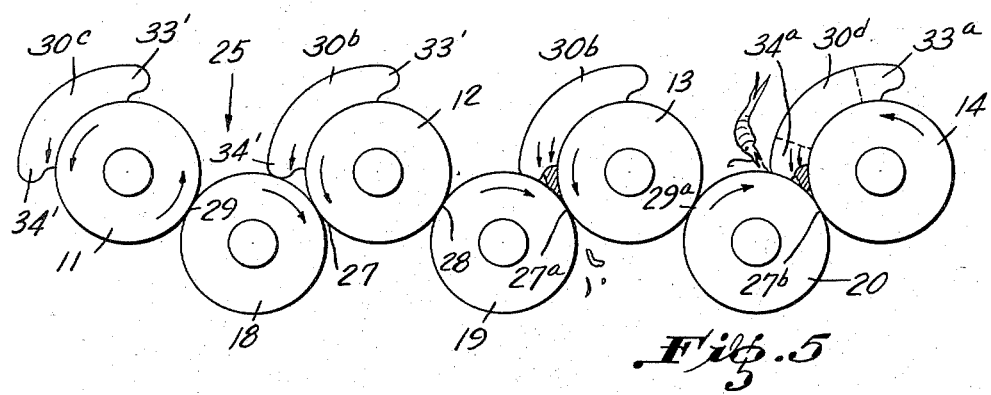
Figure 5 is an end elevational view of a number of units as shown in Figure 4 with the pressure devices in one position.
Figure 6:
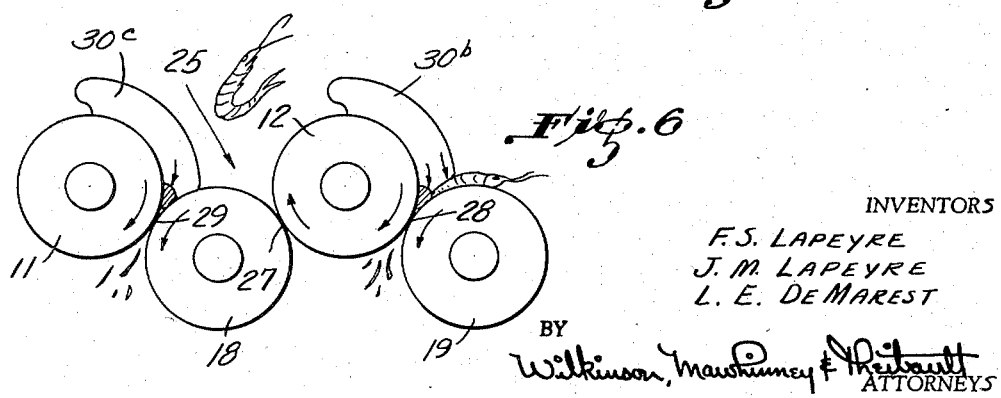
Figure 6 is a similar view showing the pressure devices in a subsequent position.

Referring more particularly to the form of invention shown in Figures 4, 5 and 6 inclusive, the pressure bodies or splines are shown at 30$^b$ and 30$^c$. The members 30$^b$ are in continuous strip form and the pressure bodies 30$^c$ are in segmental or non-continuous form, as shown in Figure 4. In this instance the pressure bodies 30$^b$ and 30$^c$ are directly attached to the rollers 11, 12, 13, 14, etc. As heretofore, the bodies 30$^b$ and 30$^c$ are made from some pliable material, for instance flexible or resilient material like rubber. The attachment of the pressure bodies to the rolls may be by adhesive or otherwise.

In the use of this form of the invention, it will be understood that the pressure bodies or splines 30$^b$, 30$^c$ are directly connected to the rollers 11, 12, 13, 14 and that there is no clutch or other slippage permitted between the pressure devices and the rollers. In other words the pressure bodies are carried back and forth with the oscillating movement of the rollers and as greater pliability or resilience will under these circumstances generally be required the entire body of the pressure devices may be made of flexible or resilient material to and including the tips 33' and 34'. Although in Figure 5 at the extreme right end of the figure the pressure device 30$^d$ may be made centrally of one material with enlarged tips 33$^a$ and 34$^a$ of flexible or yielding or resilient material, such as rubber.

These tips 33' and 34' and also 33$^a$ and 34$^a$ may be contoured to "cup" over the shrimp in the peeling position in which pattern they afford pressure toward the peeling notch and provide a "kneading" action which helps to loosen the shells.

As shown in Figure 5 between the rollers 11, 12 and 18 the shrimp and the like are fed in between such reciprocating or oscillating rollers and the pressure spline or pressure body 30$^b$ into the channel 25. In this same Figure 5 considering the roller 13 and the pressure body attached thereto, the reciprocating or oscillating stroke is timed to prevent pinch of the body 30$^b$ by the rollers. The pressure body 30$^b$ "gives" to prevent damage to the meats. The tips of the bodies may flatten out when they engage a base channel roller 18, 19, 20, etc.

In Figure 6 the shrimp directly over the base roller 19 is not in the peeling crotch. In other words the tip of the pressure body has engaged this shrimp and has yielded or become distorted to prevent damage to the shrimp or to the meat.

From a comparative standpoint Figures 5 and 6 show the change in the pressure bodies' positions as the peeling rollers reverse rotation. In so doing pressure is applied to "knead" the shrimp and press the same into the peeling crotches. The pressure bodies move from one channel and one crotch to another incident to the oscillating movement of the rollers by which they are carried and cause the opposite tips thereof to come into engagement alternately with the shrimp at the crotches.

Although I have disclosed herein the best form of the invention known to me at this time, I reserve the right to all such modifications and changes as may come within the scope of the following claims.

What is claimed is:

1. For use with a shrimp peeling machine comprising at least two rollers having a peeling crotch therebetween, a pressure body movably carried by one of the rollers and rotatable therewith into and out of a position adapted to apply pressure to the shrimp in the peeling crotch.

2. For use with a peeling machine comprising at least two rollers mounted for rotation and associated together to form a peeling crotch therebetween, a pressure body, means between said body and at least one of the rollers for carrying the body in an oscillating movement toward and from the peeling crotch.

3. For use with a shrimp peeling machine comprising at least two rollers associated together to form a peeling crotch therebetween, a pressure body, and means between said body and at least one of the rollers for entraining the body to rotate with the roller, said means including a lost motion connection between the roller and body whereby to permit movement of the roller when the body may be arrested in movement by engagement with the shrimp.

4. For use with a shrimp peeling machine comprising at least a pair of rotary rollers associated together to provide a peeling nip therebetween, a pressure body, and a friction clutch between said body and at least one of the rollers for causing the body to move in entrainment with the roller and also to permit relative movement between the roller and the body when the body encounters a large shrimp in the crotch.

5. For use with a shrimp peeling machine comprising at least two rollers associated together to form a peeling crotch therebetween, a pressure body, clutch members carried by the body and at least one of the rollers, and means for yieldably urging the clutch members together to cause entrainment of the body with the roller and to permit relative movement between the roller and body when the body encounters a shrimp in the crotch to provide a dwell period of continuous pressure by the body upon the shrimp during the continuance of the remainder of the rotary motion of the roller before reversal thereof.

6. For use in a machine for peeling shrimp comprising oscillating rollers associated together to form a shrimp peeling crotch therebetween, a pressure body oscillating with one of the rollers, clutch plates carried by the roller and the body and fitted frictionally together, and means for imposing yieldable adjustable pressure upon the clutch plates.

7. For use in a machine for peeling shrimp and the like, a pair of peeling members movable relatively to one another and associated together to form a peeling crotch therebetween, one at least of the members being a roller, a pressure body and means to entrain the body for rotation with the roller to move the body toward and from the crotch to engage and apply pressure to shrimp at the crotch during peeling operation.

8. For use with a shrimp peeling machine in which two peeling members are movably associated together to form a peeling crotch therebetween, one at least of the members being a rotary roller, a pressure body having a pliable portion adapted to encounter the shrimp at the crotch and apply pressure thereto in the direction of the crotch, and means for entraining said body with the roller for movement therewith toward and from the crotch.

9. For use with a machine for peeling shrimp comprising peeling members associated together to provide a peeling crotch therebetween, one of the members at least being a rotary roller, and a rotary pressure body carried by and movable with said rotary roller for moving toward and from said crotch.

10. For use with a machine for peeling shrimp comprising a pair of relatively movable members associated together to form a crotch therebetween for peeling shrimp, one at least of said members being an oscillating roller, an oscillating pressure body connected for movement with said roller, and a slip clutch in the connection to permit the body to have a dwell period at its crotch position when encountering the resistance of the shrimp at the peeling crotch.

11. For use in a shrimp peeling machine having at least two relatively movable peeling members associated together to form a peeling crotch therebetween, one at least of said members being an oscillating roller, a pressure body coupled to said roller to oscillate therewith and having a resilient tip position to engage shrimp in the peeling crotch in one position of the body.

12. For use with a machine for peeling shrimp comprising at least two relatively movable peeling members associated together to form a peeling crotch therebetween for receiving shrimp and the like, at least one of said members being an oscillating roller, a pressure body having a resilient tip adapted to yieldably engage shrimp in said crotch, and means between said body and roller for yieldably entraining the body to oscillate with the roller but permitting relative movement between the roller and body whereby to afford a dwell period of the resilient tip to maintain continuous pressure against the shrimp at the peeling crotch during a short angular movement of the roller on the end of its peeling stroke.

13. For use with a shrimp peeling machine comprising at least two peeling members associated together to form a peeling crotch, one at least of the members being movable, and a pressure body movable with the movable member into and out of a position adapted to apply pressure to shrimp in the peeling crotch.

References Cited in the file of this patent

UNITED STATES PATENTS

| | | |
|---|---|---|
| 573,500 | Woodman | Dec. 22, 1896 |
| 736,785 | Ross | Aug. 18, 1903 |
| 1,124,487 | Maull | Jan. 12, 1915 |
| 1,627,021 | Dueker | May 3, 1927 |
| 2,719,555 | Wood | Oct. 4, 1955 |
| 2,778,055 | Lapeyre et al. | Jan. 22, 1957 |
| 2,781,544 | Skrmetta | Feb. 19, 1957 |